United States Patent [19]

Beatty et al.

[11] 4,377,769

[45] Mar. 22, 1983

[54] CATHODOLUMINESCENT DISPLAY DEVICE INCLUDING CONDUCTIVE OR SEMICONDUCTIVE COATING ON THE PHOSPHOR

[75] Inventors: Paul H. J. Beatty; Bernard R. Venn, both of London, England

[73] Assignee: Smiths Industries Public Limited Company, London, England

[21] Appl. No.: 77,060

[22] Filed: Sep. 19, 1979

[30] Foreign Application Priority Data

Sep. 27, 1978 [GB] United Kingdom ............... 38336/78

[51] Int. Cl.³ ........................................... H01J 29/20
[52] U.S. Cl. .............................. 313/495; 252/301.6 S
[58] Field of Search ............... 313/495, 496, 467, 486; 252/301.6 S

[56] References Cited

U.S. PATENT DOCUMENTS

| | | |
|---|---|---|
| 3,560,783 | 2/1971 | Shortes ............................... 313/467 |
| 3,573,084 | 3/1971 | Gallaro ........................... 313/461 X |
| 3,622,826 | 11/1971 | Royce ................................. 313/468 |
| 4,119,562 | 10/1978 | Kagami et al. ................ 313/495 X |
| 4,208,612 | 6/1980 | Hase et al. ......................... 313/495 |
| 4,275,333 | 6/1981 | Kagami et al. ..................... 313/495 |

Primary Examiner—David C. Nelms
Assistant Examiner—Darwin R. Hostetter
Attorney, Agent, or Firm—Pollock, Vande Sande & Priddy

[57] ABSTRACT

A cathodoluminescent display device, for example a low-voltage vacuum fluorescent display device, has a source of low-voltage electrons and cathodoluminescent layer for excitation by the low-velocity electrons which comprises particles of phosphor material, for example a sulphide, selenide, telluride or oxy-sulphide phosphor, that are treated to increase their surface conductivities by, for example, deposition of a surface coating comprising conductive or semi-conductive material.

29 Claims, 1 Drawing Figure

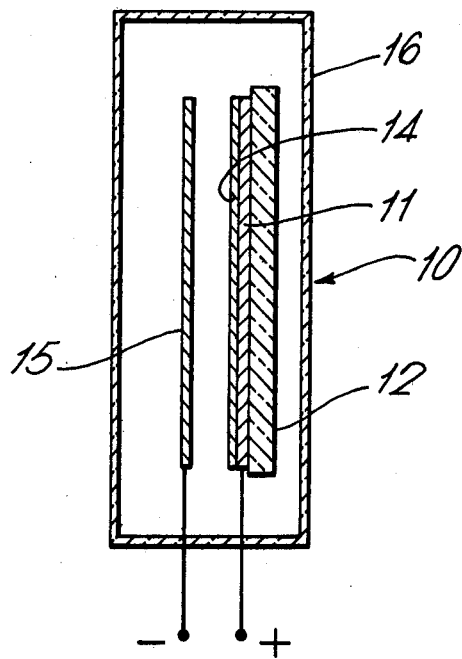

CATHODOLUMINESCENT DISPLAY DEVICE INCLUDING CONDUCTIVE OR SEMICONDUCTIVE COATING ON THE PHOSPHOR

BACKGROUND OF THE INVENTION

This invention relates to cathodoluminescent display devices. In particular the invention is concerned with cathodoluminescent display devices in which cathodoluminescent phosphor material is excited to emit light by low-velocity electrons, and is especially applicable to display devices such as low-voltage vacuum fluorescent display devices and low-voltage gas discharge display devices.

The term "low-velocity electrons" used herein means electrons having an acceleration potential in the order of 10 to 100 volts.

Heretofore, it has been common to use in, for example, low-voltage vacuum fluorescent devices, cathodoluminescent phosphor material comprising zinc oxide activated with zinc in view of its inherently conductive nature and the ability of zinc oxide phosphors to emit light in response to excitation by electrons accelereated between a potential difference in the order of 10 volts.

The color of the light emitted by such low-voltage vacuum fluorescent devices has been limited to a greenish white in view of the use of zinc oxide phosphor materials. Attempts have been made in recent years to use other phosphor materials in such low-voltage display devices by, for example, mixing zinc oxide with other phosphor materials, doping zinc sulphide to render the bulk of the material more conductive or by using an inherently more conducting phosphor material such as, for example, europium doped tin oxide in order to produce a wider range of colors.

SUMMARY OF THE INVENTION

It is an object of the present invention to provide additional cathodoluminescent phosphor compositions which are suitable for use in low-voltage, and therefore low-velocity electron, vacuum fluorescent display devices and gas discharge display devices.

It is another object of the present invention to provide cathodoluminescent display devices which are capable of emitting light in a variety of colors.

In accordance with this invention, there is provided a cathodoluminescent display device having means for generating low-velocity electrons and a cathodoluminescent layer which is to emit light in response to excitation thereof by said low-velocity electrons, in which said cathodoluminescent layer comprises particles of phosphor material which are treated to increase their surface conductivities. This increase in surface conductivity of the particles of phosphor material may be achieved by, for example, chemical treatment, or by vapour deposition or sputtering of conductive or semiconductive material onto the surface of the particles.

By treating phosphor materials in this manner, it has been found that various phosphor materials previously thought to be unsuitable for use in low-voltage vacuum fluorescent display devices and the like, can be made to operate satisfactorily.

Cathodoluminescent display devices in accordance with the present invention, and in the particular form of low-voltage vacuum fluorescent display devices, will now be described with reference to the accompanying drawing.

BRIEF DESCRIPTION OF THE DRAWING

The drawing shows schematically a section through a typical low-voltage vacuum fluorescent display device employing a cathodoluminescent phosphor composition that is excited by low-velocity electrons.

DETAILED DESCRIPTION

Referring to the drawing, the typical vacuum fluorescent device 10, which in this particular case is of the diode type, includes an aluminum anode layer 11 carried on a substrate 12 of, for example, ceramic material. The anode layer 11 is coated with a layer 14 of fluorescent phosphor material. A cathode 15 is mounted above, and spaced from the fluorescent phosphor layer 14 and arranged such that when a low voltage is applied between the cathode 15 and the anode layer 11, low-velocity electrons emitted from the cathode 15 impinge on the fluorescent phosphor material of the layer 14 and cause the layer 14 to emit light. The substrate 12, layers 11 and 14 and the cathode 15 are all disposed within a sealed glass envelope 16 which is evacuated.

In accordance with this invention, the layer 14 is provided by a fluorescent phosphor composition which comprises particles of phosphor material that have been treated to increase the electrical conductivity of their respective surfaces. This increase in surface conductivity of the phosphor particles may be achieved by chemical treatment or by vapour deposition of metals such as, for example, copper or other conducting materials.

As an example of the preparation of one fluorescent phosphor composition, particles of zinc sulphide, activated in a known manner with 0.05 wt % copper and 0.4 wt % manganese, were subjected to an aqueous solution of cupric ions. As a result, the phosphor material turned dark green in appearance and the particles of phosphor material were found to have electrically-conductive copper ions adhering to their surfaces. It is believed that a chemical exchange of zinc ions for copper ions occurs in the surfaces of the phosphor particles. By way of example of the typical relative dimensions involved, a particle of phosphor material may have an overall average diameter in the order of 1 $\mu$m and the electrically-conductive coating, which in this particular case comprises copper ions and is substantially uniform, may be in the order of 3 Angstroms thick.

When the fluorescent phosphor composition produced in this manner was deposited on the anode layer of a vacuum fluorescent device, it was found to respond to a threshold voltage of 10.3 volts; that is, substantially the same as that for conventional zinc oxide phosphor material.

Various other methods are proposed for preparing the fluorescent phosphor compositions for display devices in accordance with this invention. These methods generally result in the formation of a thin electrically-conductive coating on the surfaces of the particles of the phosphor material which enables surface charge arising from electron impact during operation of the display device in which the fluorescent composition is used to be conducted away to the underlying electrode.

Alternative methods of preparing fluorescent phosphor compositions for use with the present invention involve the coating of the surfaces of sulphide, selenide, telluride and oxy-sulphide phosphor particles with copper from a vaporised copper compound or from aqueous or non-aqueous copper solutions at room or elevated temperatures. The phosphor material may or may not be previously doped in the bulk with copper and other activating or coactivating ions.

Examples of suitable phosphor materials include $Zn_xCd_{1-x}S$: Mn; CdTe; ZnTe; ZnS:Cu,Mn; ZnS:Mn; ZnS: Cu; CdS: Cu; ZnS: Ag; ZnS: Cu, Cl; ZnS: Pb, Li; SrS: Mn; CeS: Mn; CaS: Er, Cl; CdS: Mn; ZnSe: Mn; CaS: Bi, K; CaS: Ce, Cl; CrS: Ce; $Ba_2ZnS_3$: Mn; ZnS: Eu; or mixtures thereof. Other rare earth activators can also be used such as Tb, Ho, Nd and Tm.

A further method of preparing fluorescent phosphor compositions involves the deposition onto the surface of the phosphor particles of a thin coating of tin oxide or indium oxide suitably doped with antimony and tin, respectively, or otherwise treated to be conducting. Stannous or stannic salts, with dopants, and heated in air or moisture, respectively, may be used. Alternatively, chemical vapor deposition, and either sputtering or evaporation in a vacuum system may be used.

Another method of preparing fluorescent phosphor materials for use with the present invention involves the deposition on the surfaces of the phosphor particles of a thin coating of metal such as copper, gold, silver or zinc by sputtering, vacuum evaporation or chemical vapor deposition. Sources of the metal would be the element or a suitable organo-metallic compound thereof.

In a further alternative method of preparing the fluorescent phosphor compositions, the surfaces of the phosphor particles are coated with a thin semi-conducting film comprising, for example, selenium, cadmium sulphide, zinc oxide, cadmium selenide or copper sulphide. The conducting properties of these materials may be enhanced as a result of their photoconductive properties. The thin film may be deposited in a vacuum by sputtering or by evaporation, by chemical vapor deposition, or by heat treatment of copper or cadmium coated sulphide phosphor particles in a suitable sulphurising atmosphere.

Yet another method of preparing fluorescent phosphor material for use with display devices in accordance with the present invention involves the deposition of organic and other materials from solution which are able to render the surface of the phosphor particles more conductive by reason of charge transfer adsorption.

The coatings on the surface of the phosphor particles as a result of such deposition are substantially uniform and preferably are sufficiently thin so as not to impede the passage of impacting electrons therethrough and so as to minimise the proportion absorbed of the light emitted by the phosphor particles during operation of the display device in which the fluorescent phosphor composition is used. As previously mentioned in connection with the specific example of particles of phosphor material comprising zinc sulphide activated with copper and manganese and coated with copper ions, the average phosphor particle diameter may be in the order of 1 μm and the coating around 3 Angstroms in thickness. For the same phosphor material coated with doped tin oxide for example, the coating may be preferably in the order of 100-500 Angstroms in thickness so as to achieve the desired conductivity characteristics.

By using a material which is capable of absorbing light in a predetermined part of the spectrum, to provide the coating on the surface of the phosphor particles, a reduction in the scattering of ambient light can be achieved and hence an improvement in display contrast of the display device in which the fluorescent phosphor composition is used.

The coatings deposited on the surface of the phosphor particles need not be homogeneous but may be linked patterns of conductive tracks which together would be sufficient to render the whole surface conductive.

We claim:

1. A cathodoluminescent display device having means for generating low-velocity electrons with an excitation potential of about 10 to about 100 electron volts and a cathodoluminescent layer which is to emit light in response to excitation thereof by said low-velocity electrons, in which said cathodoluminescent layer comprises particles of a phosphor material having a coating of a material selected from the group of an electrically conductive or semi-conductive material to increase the surface conductivity of said particles, said coating permitting the passage of electrons at said low velocity to excite said phosphor particles.

2. A cathodoluminescent display device according to claim 1, wherein said electrically-conductive material comprises copper.

3. A cathodoluminescent display device according to claim 1, wherein said electrically-conductive material comprises gold.

4. A cathodoluminescent display device according to claim 1, wherein said electrically-conductive material comprises silver.

5. A cathodoluminescent display device according to claim 1, wherein said electrically-conductive material comprises doped tin oxide.

6. A cathodoluminescent display device according to claim 1, wherein said electrically-conductive material comprises zinc.

7. A cathodoluminescent display device according to claim 1, wherein said semi-conductive material comprises selenium.

8. A cathodoluminescent display device according to claim 1, wherein said semi-conductive material comprises cadmium sulphide.

9. A cathodoluminescent display device according to claim 1, wherein said semi-conductive material comprises zinc oxide.

10. A cathodoluminescent display device according to claim 1, wherein said semi-conductive material comprises cadmium selenide.

11. A cathodoluminescent display device according to claim 1, wherein said semi-conductive material comprises copper sulphide.

12. A cathodoluminescent display device according to claim 1, wherein said phosphor material comprises a sulphide phosphor.

13. A cathodoluminescent display device according to claim 1, wherein said phosphor material comprises a selenide phosphor.

14. A cathodoluminescent display device according to claim 1, wherein said phosphor material comprises a telluride phosphor.

15. A cathodoluminescent display device according to claim 1, wherein said phosphor material comprises an oxy-sulphide phosphor.

16. The cathodoluminescent display device of claim 1 in which said phosphor material is selected from the group of sulphide, selenide, telluride, or oxy-sulphide phosphors.

17. The cathodoluminescent display device of claim 1 in which said coating is formed from a material selected from the group of copper, gold, silver, doped tin oxide, zinc, doped indium oxide, selenium, cadmium sulphide, zinc oxide, cadium selenide, or copper sulphate.

18. The cathodoluminescent display device of claim 1 in which the phosphor material is subjected to an aqueous solution of cupric ions.

19. The cathodoluminescent display device of claim 1 in which the phosphor material is subjected to a chemical vapor deposition process to coat the particles of the phosphor.

20. The cathodoluminescent display device of claim 1 in which the phosphor material is subjected to a sputtering process to coat the particles of the phosphorescent material.

21. A cathodoluminescent display device having electron-emitting means for generating low-velocity electrons with an excitation potential of about 10 to about 100 electron volts and a cathodoluminescent layer so disposed as to have impinging thereon the electrons from said electron-emitting means, said cathodoluminescent layer comprising particles of zinc sulphide activated with about 0.05 percent by weight of copper and about 0.4 percent by weight of manganese and with said particles having a diameter of about 1 $\mu$m, said particles being coated with copper by subjecting said phosphor material to an aqueous solution of cupric ions to provide a particle coating with a thickness of about 3 Angstroms to increase the surface conductivity of said particles, said coating permitting the passage of electrons at said low velocity to excite said phosphor particles.

22. The device of claim 1 being a low-voltage vacuum fluorescent display device.

23. The device of claim 1 being a low-voltage gas discharge display device.

24. The device of claim 1 wherein said phosphor material has an overall average diameter in the order of 1 $\mu$m and wherein the coating comprises copper ions in the order of 3 Å thick.

25. The device of claim 1 wherein said phosphor material has an overall average diameter in the order of 1 $\mu$m and wherein the coating comprises doped tin oxide in the order of 100 to 500 Å thickness.

26. The device of claim 1 wherein said phosphor material comprises particles of zinc sulfide.

27. The device of claim 26 wherein said zinc sulfide is actuated with copper and manganese.

28. The device of claim 1 wherein said phosphor material is selected from the group of $Zn_xCd_{1-x}S:Mn$; CdTe; ZnTe; ZnS:Cu,Mn; ZnS:Mn; ZnS:Cu; CdS:Cu; ZnS:Ag; ZnS:Cu,Ce; ZnS:Pb,Li; SrS:Mn; CeS:Mn; CaS:Er,Ce; CdS:Mn; ZnSe:Mn; CaS:Bi,K; CaS:Ce,Cl; SrS:Ce; $Ba_2ZnS_3$:Mn; ZnS:Eu or mixtures thereof.

29. The device of claim 1 wherein said electrically-conductive material comprises doped indium oxides.

* * * * *